United States Patent
Garlapati et al.

(10) Patent No.: US 10,091,278 B1
(45) Date of Patent: Oct. 2, 2018

(54) DATA EXCHANGE SERVICES

(71) Applicant: Amazon Technologies, Inc., Seattle, WA (US)

(72) Inventors: Vikram Garlapati, Redmond, WA (US); Matthew Thomas Tavis, Seattle, WA (US); Thomas Charles Stickle, Saint James, NY (US)

(73) Assignee: Amazon Technologies, Inc., Seattle, WA (US)

( * ) Notice: Subject to any disclaimer, the term of this patent is extended or adjusted under 35 U.S.C. 154(b) by 255 days.

(21) Appl. No.: 14/576,052

(22) Filed: Dec. 18, 2014

(51) Int. Cl.
*G06F 15/16* (2006.01)
*H04L 29/08* (2006.01)

(52) U.S. Cl.
CPC .............. *H04L 67/10* (2013.01); *H04L 67/02* (2013.01)

(58) Field of Classification Search
CPC ................................ H04L 67/10; H04L 67/02
USPC ......................................................... 709/201
See application file for complete search history.

(56) References Cited

U.S. PATENT DOCUMENTS

| | | | | |
|---|---|---|---|---|
| 2007/0168200 A1* | 7/2007 | Shimizu | .............. | G06Q 30/02 700/90 |
| 2014/0040444 A1* | 2/2014 | Lee | .................... | H04L 41/0806 709/222 |

FOREIGN PATENT DOCUMENTS

CN 102694706 A * 9/2012

OTHER PUBLICATIONS

Mike Gilpin, "From the Field: The First Annual Cannonical Model Management Forum," Mar. 15, 2010, Forrester.*

* cited by examiner

*Primary Examiner* — Richard G Keehn
(74) *Attorney, Agent, or Firm* — Thorpe North & Western, LLP.

(57) ABSTRACT

Technology is described for providing data exchange services. A set of definitions for a data exchange service that is accessible via a data exchange domain may be received. The data exchange service may be configured to facilitate an exchange of device reporting information transformed using the set of definitions. The exchange may be between a first device and a second device. The device reporting information may be received from the first device. The first device may be registered with the data exchange service. The device reporting information may be in accordance with the set of definitions. The device reporting information may be forwarded to a second device via the data exchange service. The device reporting information may be converted to a data format that is readable by the second device, and the device reporting information may be forwarded to a second device via the data exchange service.

20 Claims, 8 Drawing Sheets

DATA EXCHANGE SERVICES

BACKGROUND

The Internet of Things (IoT) is the interconnection of computing devices scattered across the globe within the existing Internet infrastructure. Each computing device may be assigned a unique identifier, such as an Internet Protocol version 6 (IPv6) address, an IPv4 address, a uniform resource identifier (URI), or a global unique identifier. The computing devices may be able to capture information, and then securely communicate the information over a network to other computing devices or a centralized server computer. The computing devices may be embedded in a variety of products, such as home appliances, automobiles, thermostats, smart traffic lights, etc. The Internet of Things may be useful for a number of applications, such as environmental monitoring, infrastructure management, industrial applications, building and home automation, energy management, medical and healthcare systems, transport systems, etc. In one specific example, a commercial refrigeration manufacturer may have computing devices scattered across hundreds of locations, and the computing devices may be communicating and exchanging information with each other over various types of networks.

DETAILED DESCRIPTION

Figure 1:
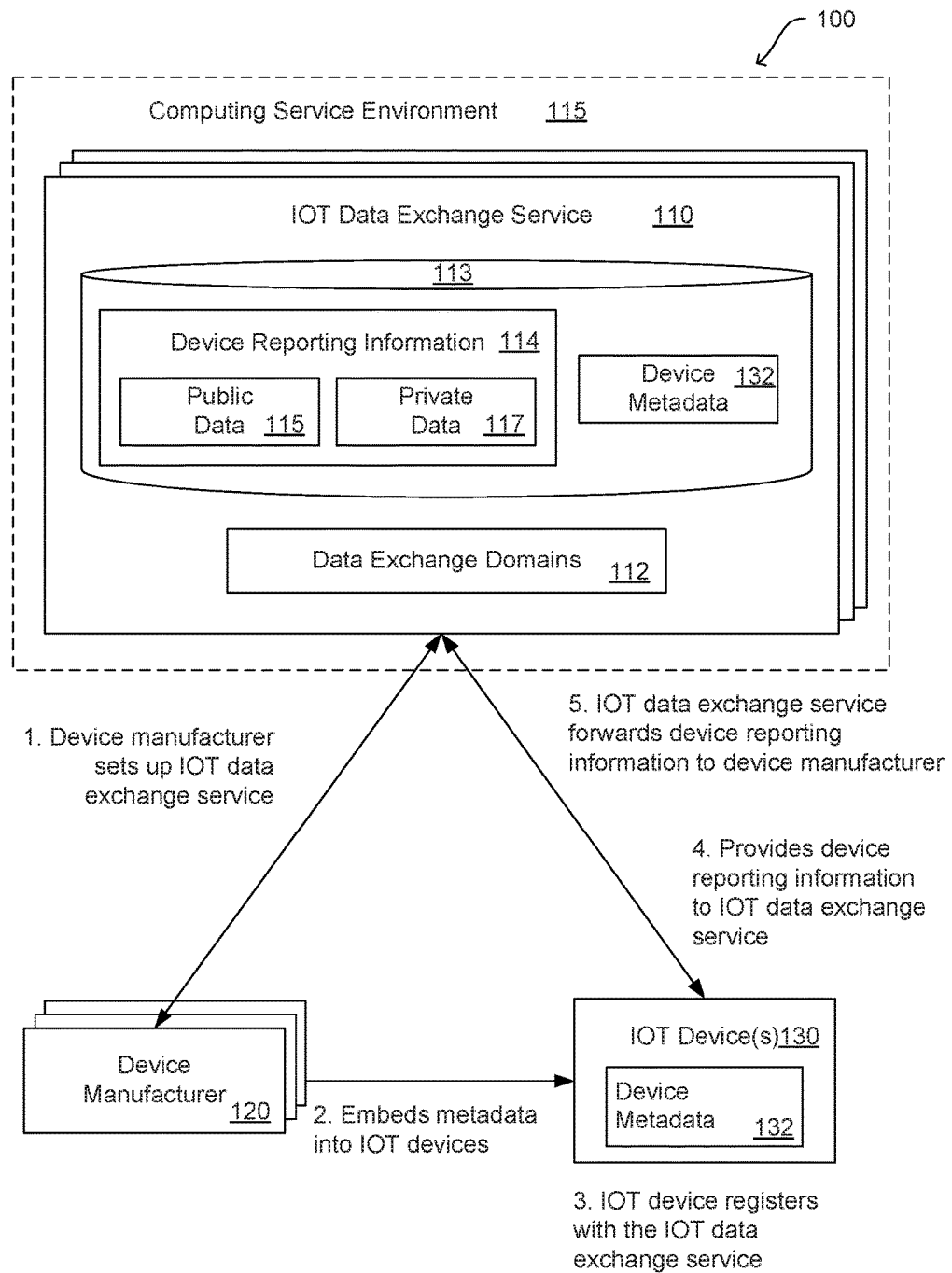
FIG. 1 illustrates a system and related operations for creating a data exchange service to enable a device to provide device reporting information according to an example of the present technology.

A technology is described for providing a platform that allows a customer (e.g., a device manufacturer) to set up a data exchange service in a computing service environment. The data exchange service may enable a plurality of devices (e.g., devices that are manufactured by the device manufacturer) to provide device reporting information to the data exchange service. The devices can be part of Internet of Things (IOT) which are incorporated in the interconnection of uniquely identifiable embedded computing devices within the existing internet. The device reporting information (e.g., health information, status information) may be provided to the data exchange service after a device completes a registration process. The device reporting information that is provided to the data exchange service may be in accordance with a defined format (or canonical format). The canonical format may refer to a uniform format that is supported by the devices. The device manufacturer may access the device reporting information via the data exchange network. The device manufacturer may perform an analysis on the device reporting information and/or make decisions (e.g., design decisions, marketing decisions) based on the device reporting information.

The terms "device" and "IOT device," as used herein, generally refer to an electronic device that is assigned a unique identifier and is capable of communicating data over a network to a central location. In other words, the device may both receive and transmit data over the network. The unique identifier assigned to the device may include an Internet Protocol version 6 (IPv6) address, an IPv4 address, a uniform resource identifier (URI), a uniform resource locator (URL), or a global unique identifier. The device may communicate the data over a wireless network using an appropriate communication protocol, which includes but is not limited to WiFi, Long Term Evolution (LTE) telecommunications standards or Bluetooth, and then the information may be communicated across a wired network using protocols such as TCP/IP (transmission control protocol/internet protocol) or another networking protocol. Non-limiting examples of the device may include rice cookers, garage door openers, toys, automobile parts, sensors, etc.

In one configuration, a device manufacturer (e.g., a business customer) may provide a set of instructions and definitions when setting up the data exchange service. For example, the device manufacturer may define a format (e.g., a canonical format) for the device reporting information that is reported from the device. The device manufacturer may define portions of the device reporting information as being public information, private information or device metadata. The device may share public information with the device manufacturer or other devices. Private information may not be shared with the device manufacturer, other third parties, other subscribers, other users, etc. depending on how the permissions for the private information are set. In addition, private information may not be shared with the other devices. The device metadata may define the device's capabilities, policy information, the format of the device reporting information, and other information that describes the device. In one example, the device manufacturer may provide instructions defining workflows to be performed by the data exchange service and/or the device based on a type of device reporting information or the content of information that is reported. The device manufacturer may provide other various types of instructions and definitions when setting up the data exchange service.

A data exchange domain (e.g., a domain name or network address) may be created for the data exchange service. The data exchange service may generate a unique identifier for the device manufacturer to embed into the device. The unique identifier may be the IPv6 address, the URI, or the global unique identifier to be associated with the device. The device manufacturer may include the data exchange domain, the unique identifier, the format for the device reporting information, data sharing rules (e.g., private data versus public data), workflow rules, etc. in device metadata that is embedded into the device. In one example, the device metadata may be embedded during a manufacturing process of the device, or alternatively, the device's metadata may be updated when the device performs a software update/upgrade.

The device may perform the registration process with the data exchange service using the device metadata (e.g., the data exchange domain, the unique identifier) embedded into the device. For example, the device may access the data exchange domain and provide the unique identifier in order to complete the registration process. Following completion of the registration process, the device may periodically provide device reporting information to the data exchange service. As previously explained, the device may communicate the device reporting information using TCP/IP, WiFi, Long Term Evolution (LTE) telecommunications standards, or other networking protocols, etc. The device reporting information may include health information for the device, a current location of the device, a current status of the device, usage levels, error codes, performance metrics, etc. The device reporting information may be uploaded onto a server associated with the data exchange service. In one example, the device reporting information may trigger a workflow to be performed on the device by the data exchange service. As a non-limiting example, the device may report an error code and in response, the data exchange service may be triggered to perform a workflow that involves contacting a user or a repair person associated with the device.

The device manufacturer may log into an account associated with the data exchange service in order to access the device reporting information for the device. For example, the device manufacturer may access device reporting information for a plurality of devices over a defined time period (e.g., a last week). In one configuration, the data exchange service may aggregate the device reporting information and perform an analysis using a defined analysis tool. The data exchange service may provide the analyzed data to the device manufacturer. The device manufacturer may make business decisions based on the device reporting information. For example, the device manufacturer may learn of particular device features that are popular and therefore, the device manufacturer may incorporate these device features into other product lines. As another example, the device manufacturer may learn of a software glitch and in order to fix the software glitch, the device manufacturer may send an update to the device via the data exchange service.

FIG. 1 illustrates an exemplary system 100 and related operations for creating an Internet of Things (IOT) data exchange service 110 in a computing service environment 115. The computing service environment 115 may include a number of tools and/or components for building the IOT data exchange service 110. For example, the computer service environment may provide virtualized computing service, virtualized storage services and virtualized networking services upon which the IOT data exchange service 110 may operate. The IOT data exchange service 110 may enable an Internet of Things (IOT) device 130 to provide device reporting information 114 to the IOT data exchange service 110. The IOT data exchange service 110 may be created for a customer, such as a device manufacturer 120, upon receiving setup instructions from the customer. Alternatively, the customer may be a third party that is interested in receiving the device reporting information 114. The instructions for setting up the IOT data exchange service 110 may include a defined data format (or canonical format), workflows, data sharing permissions (e.g., public data versus private data), etc. The IOT data exchange service 110 may create a data exchange domain 112 (e.g., a domain name, network address, or other network identifiable name) for the IOT data exchange service 110.

The IOT data exchange service 110 may generate a unique identifier for the IOT device 130. The IOT data exchange service 110 may provide the data exchange domain 112 and the unique identifiers to the device manufacturer 120. The device manufacturer 120 may include the data exchange domain 112, the unique identifier, the defined data format, the workflows, the data sharing permissions, etc. in device metadata 132 that is embedded into the IOT device 130. The IOT device 130 may access information within the device metadata 132 (e.g., the data exchange domain 112, the unique identifier) in order to register with the IOT data exchange service 110. In one example, the device metadata 132 may also be stored in a data store 113 at the IOT data exchange service 110. Upon registration with the IOT data exchange service 110, the IOT device 130 may provide device reporting information 114 to the data exchange domain 112 for the IOT data exchange service 110. The device reporting information 114 may be stored in the data store 113 at the IOT data exchange service 110. The device reporting information 114 may include public data 115 and/or private data 117. The public data 115 may be shared with the device manufacturer 120 and other interested parties. The private data 117 may be shared with the device manufacturer 120 or with other interested parties that are granted appropriate permissions to access the private data 115. The IOT data exchange service 110 may forward the device reporting information 114 to the device manufacturer 120 or another data subscriber with the appropriate rights. Alternatively, the IOT data exchange service 110 may analyze the device reporting information 114 using an analysis tool, and then provide the analyzed device reporting information to the device manufacturer 120 or another party subscribed to receive the device reporting information 114. In one example, a copy of the device metadata 132 may be stored at the IOT data exchange service 110.

As a non-limiting example, the device manufacturer 120 may be a toy manufacturer and the IOT devices 130 may be eLearning toys. The toy manufacturer may desire to sign up with the IOT data exchange service 110, so that device reporting information 114 from the eLearning toys may be aggregated at a common platform and be easily accessible to the toy manufacturer. The data exchange domain 112 may be created for the device manufacturer's IOT data exchange service 110. As an example, the data exchange domain 112 may be "eLearning.dataexchange1.serviceprovider.com". In addition, the toy manufacturer may define the format for the device reporting information 114, workflows, etc. within the IOT data exchange service 110. The toy manufacturer may be provided with a set of unique addresses (e.g., IPv6 addresses) for the eLearning toys. The toy manufacturer may embed device metadata 132 in each of the eLearning toys. The device metadata 132 may include the unique identifier and the data exchange domain 112. The eLearning toys may be purchased by users who desire to register the eLearning toys with the IOT data exchange service 110. After registering with the IOT data exchange service 110, the eLearning toys may communicate device reporting information (e.g., health information) to the IOT data exchange service 110. The device reporting information 114 may be stored at the IOT data exchange service 110 and may be accessible to the toy manufacturer. As a result, the toy manufacturer may acquire a wealth of information about the eLearning toys and may accordingly perform business decisions based on that information. For example, the toy manufacturer may learn of common glitches found in the eLearning toys and design software patches to solve those glitches.

Figure 2:
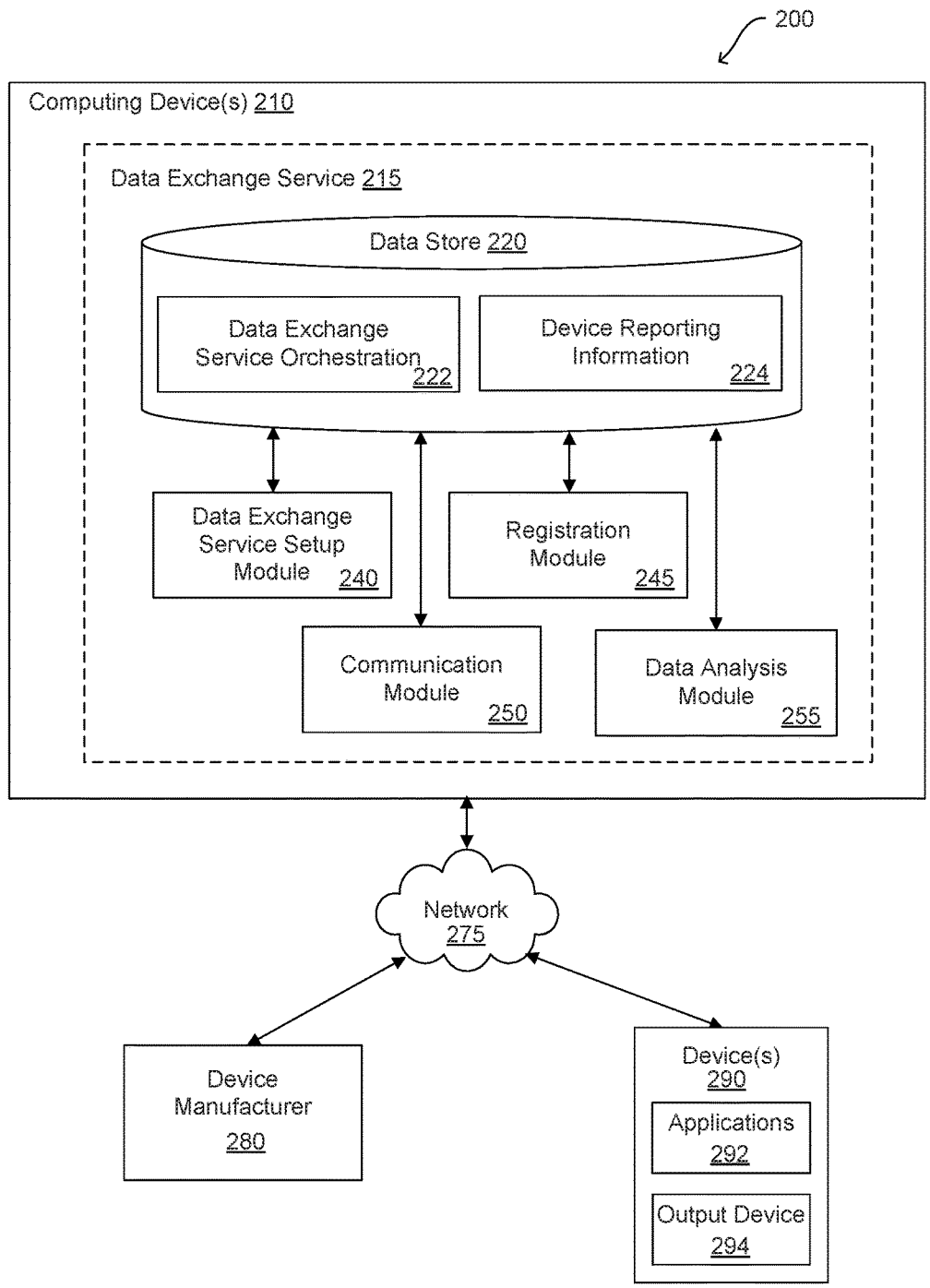
FIG. 2 is an illustration of a networked system for providing data exchange services according to an example of the present technology.

In the following discussion, a general description of an example system for providing data exchange services and the system's components are provided. The general description is followed by a discussion of the operation of the components in a system for the technology. FIG. 2 illustrates a networked environment 200 according to one example of the present technology. The networked environment 200 may include one or more computing devices 210 in data communication with a device 290 (also known as a client) by way of a network 275. The computing device 210 may include a data exchange service 215. The data exchange service 215 may be an Internet of Things (IOT) data exchange service. In addition, and the device 290 can be an IOT device. The network 275 may include the Internet, intranets, extranets, wide area networks (WANs), local area networks (LANs), wired networks, wireless networks, or other suitable networks, etc., or any combination of two or more such networks.

Various applications, services and/or other functionality may be executed in the computing device 210 according to varying embodiments. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data stored in the data store 220 may include data exchange service orchestration 222. The data exchange service orchestration 222 may define a setup scheme for the data exchange service 215. The data exchange service 215 may be set up for a particular customer (e.g., a device manufacturer 280). The data exchange service 215 may enable a plurality of devices 290 to provide device reporting information 224. The data exchange service orchestration 222 may include a data exchange domain associated with the data exchange service 215. The data exchange service orchestration 222 may include workflow rules to be performed for the devices 290 depending on device reporting information 224. The data exchange service orchestration 222 may define portions of the device reporting information 224 as being public information, private information or device metadata. The data exchange service orchestration 222 may include an architecture used for creating the data exchange service 215, defined data formats for providing the device reporting information 224, and device capabilities for the devices 280. The data exchange service orchestration 222 may describe a set of publishers (e.g., devices 290 that are capable of sending data to the data exchange service 215) and/or listeners (e.g., devices 290 that are capable of receiving data from the data exchange service 215). The data exchange service orchestration 222 may include a set of unique identifiers that are assigned to the devices 290. The unique identifiers may include an Internet Protocol version 6 (IPv6) address, a uniform resource identifier (URI), or a global unique identifier. The data exchange service orchestration 222 may define customer settings for providing the device reporting information 224 (e.g., a frequency at which the device reporting information 224 is to be provided) and/or analysis settings that define a selected technique for analyzing the device reporting information 224. In one example, the data exchange service orchestration 222 may be updated based on instructions received from the device manufacturer 280.

The data stored in the data store 220 may include device reporting information 224. The device reporting information 224 may be received from the devices 290 via the data exchange service 215. The device reporting information 224 may include health information for the devices 290, current locations of the devices 290, current statuses for the devices 290, usage levels, error codes, performance metrics, etc. The device reporting information 224 may be stored for a predefined period of time, as defined by the device manufacturer 280 or another customer. In one example, the device reporting information 224 may be directly accessible to the device manufacturer 280. In an alternative example, an analyzed version of the device reporting information 224 may be accessible to the device manufacturer 280.

The components executed on the computing device 210 may include a data exchange service setup module 240, a registration module 245, a communication module 250, a data analysis module 255, and other applications, services, processes, systems, engines, or functionality not discussed in detail herein. The data exchange service setup module 240 may be configured to generate a data exchange service 215 using definitions received. The data exchange service 215 may be accessible via a data exchange domain (e.g., a domain name). The data exchange service setup module 240 may receive instructions from a customer (e.g., a device manufacturer 280) for setting up the data exchange service 215. The data exchange service 215 may enable a device 290 to provide device reporting information 224, and the device reporting information 224 may be accessible to the customer via the data exchange service 215. In one example, the data exchange service setup module 240 may receive instructions that specify a data format for exchanging the device reporting information 224. The data exchange service setup module 240 may receive instructions that define portions of the device reporting information 224 as being public information, private information or device metadata. In addition, the data exchange service setup module 240 may receive instructions regarding workflow rules to be performed for the device 290 based on the device reporting information 224. Based on the instructions received from the device manufacturer 280, the data exchange service setup module 240 may generate the data exchange service 215 for the device manufacturer 280 and the devices 290.

The registration module 245 may be configured to receive a registration request from the device 290. The registration request may indicate that the device 290 desires to be registered with the data exchange service 215. In one example, the data exchange domain may be included in device metadata that is embedded into the device 290. When the device's user instructs the device 290 to register with the data exchange service 215, the device 290 may access the embedded device metadata and connect to the data exchange domain in order to initiate a registration process. The request may include a unique identifier associated with the device 290. The registration module 245 may register the device 290 with the data exchange service 215, and upon completion of the registration process, the device 290 may be enabled to provide device reporting information 224 to the data exchange domain.

The communication module 250 may be configured to receive the device reporting information 224 from the device 290 in accordance with a defined data format via the data exchange service 215. The communication module 250 may receive the device reporting information 224 following registration of the device 290. The device reporting information 224 may include health information for the device 290, a current location of the device 290 and/or a current status of the device 290. In one configuration, the communication module 250 may send updated schemes for the data exchange service 215 to the device 290. The communication module 250 may send software updates, security patches, etc. to the device 290 via the device manufacturer 280. In addition, the communication module 250 may be involved in performing certain workflows for the device 290 based on the device reporting information 224, such as sending an alert to the device's user.

In one example, the communication module 250 may forward the device reporting information 224 from the data exchange service 215 to an additional device for consumption at the additional device. The device reporting information 224 that is forwarded to the additional device may be converted to a canonical data format that is readable at the additional device. Thus, the data exchange service 215 can act as a broker for exchanging the device reporting information 224 between the device 290 and the additional device. In other words, the device 290 and additional device may communicate with each other via the data exchange service 215.

The data analysis module 255 may be configured to analyze the device reporting information 224 received from the device 290 according to a selected analysis tool. The analysis tool may be automatically selected by the data exchange service 215 and/or defined by the device manufacturer 280. In one example, the data analysis module 255 may identify trends in the device reporting information 224. The data analysis module 255 may cluster related portions of the device reporting information 224 together using pattern recognition, machine learning, or other data analysis techniques. As non-limiting examples, the data analysis module 255 may determine which product features are the most popular or unpopular, and which error codes are reported most frequently from the devices 290. The data analysis module 255 may provide the analyzed device reporting information to enable the device manufacturer 280 to make business decisions based on the analyzed device reporting information. For example, the device manufacturer 280 may use the analyzed device reporting information to launch new products, market existing products to additional audiences, remove unpopular product features, etc.

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 210 may comprise, for example, a server computer or any other system providing computing capability. Alternatively, a plurality of computing devices 210 may be employed that are arranged, for example, in one or more server banks, computer banks or other computing arrangements. For example, a plurality of computing devices 210 together may comprise a clustered computing resource, virtualization server, a grid computing resource, and/or any other distributed computing arrangement. Such computing devices 210 may be located in a single installation or may be distributed among many different geographical locations. For purposes of convenience, the computing device 210 is referred to herein in the singular. Even though the computing device 210 is referred to in the singular, it is understood that a plurality of computing devices 210 may be employed in the various arrangements as described above.

The device 290 may be representative of a plurality of devices 290 (or clients) that may be coupled to the network 275. The device 290 may be an electronic device that is assigned a unique identifier and capable of communicating data over the network 275. The device 290 may comprise, for example, a processor-based system such as a computer system. Such a computer system may be embodied in the form of a desktop computer, a laptop computer, mobile devices, personal digital assistants, cellular telephones, smartphones, set-top boxes, network-enabled televisions, music players, tablet computer systems, game consoles, electronic book readers, or other devices with like capability. In one configuration, the device 290 may include consumer products (e.g., rice cookers, printers, or scanners), home automation products (e.g., smart thermostats, smart refrigerators, heating, air conditioning, etc.), sensors, or other devices that are assigned unique identifiers and are capable of communicating data over the network 275. Commercial devices may also be included in the definition of a device 290, including: commercial printing presses, commercial freezers, commercial kilns, commercial mixers or other commercial equipment.

The device 290 may be configured to execute various applications 292. The applications 292 may correspond to standalone applications, such as networked applications. In addition, the device 290 may be configured to execute applications 292 that include, but are not limited to, monitoring applications, feedback applications, reporting applications, email applications, instant message applications, and/or other applications. The device 290 may include or be coupled to an output device 294. The output device 294 may comprise, for example, one or more devices such as cathode ray tubes (CRTs), liquid crystal display (LCD) screens, gas plasma-based flat panel displays, LCD projectors, or other types of display devices, etc. In addition, the output device 294 may include an audio device, tactile device (e.g., braille machine) or another output device to feedback to a customer.

Figure 3:
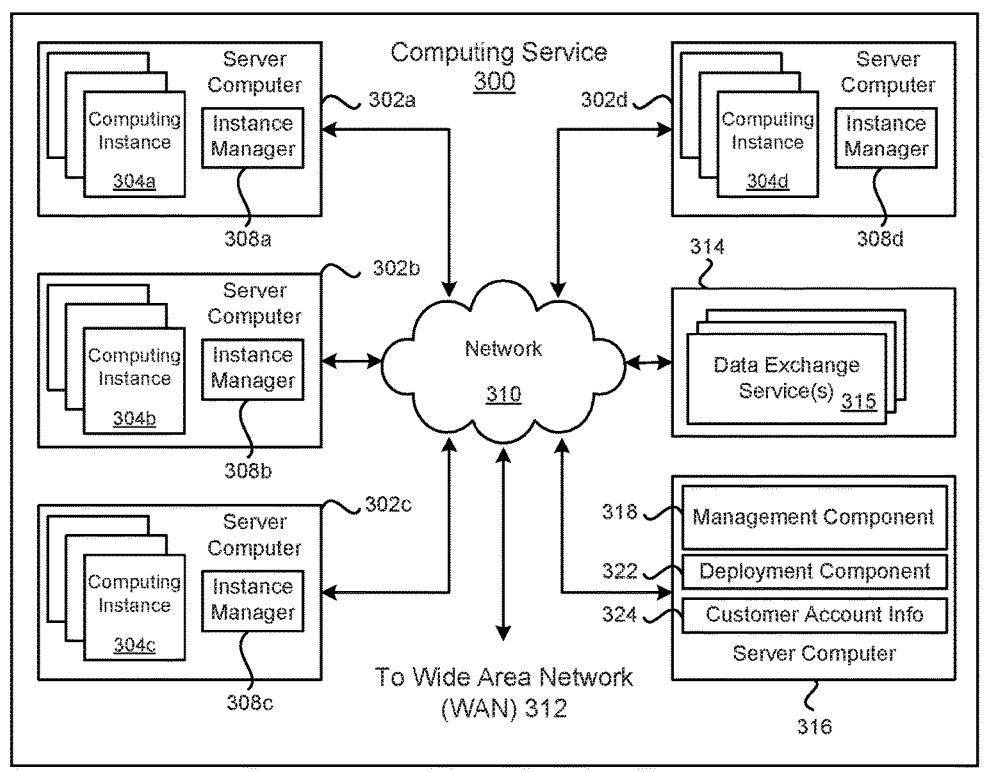
FIG. 3 is a block diagram of a computing service environment according to an example of the present technology.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients, such as device manufacturers. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software (e.g., data exchange services software) in the computing service 300. End customers may access the computing service 300 using networked client devices, such as desktop computers, laptops, tablets, smartphones, etc running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications, such as data exchange service applications.

In one example, data exchange services 315 may be run on a computing instance or server computer 314 in the computing service 300. The data exchange services 315 can be Internet of Things (IOT) data exchange services. A data exchange service 315 may be tailored for a particular customer. The data exchange service 315 may provide a platform in the computing service 300 that allows devices (that are associated with the customer) to provide device reporting information (e.g., location information, health information) to the data exchange service 315. In one configuration, the data exchange services 315 may also be implemented on the computing instances 304a-d that are executed on the server computers 302a-d.

A server computer 316 may be reserved to execute software components for managing the operation of the computing service 300 and the computing instances 304a-d. The server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d. A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302a-d. The network topology illustrated in FIG. 3 has been simplified, as many more networks and networking devices may be utilized to interconnect the various computing systems disclosed herein.

Figure 4:
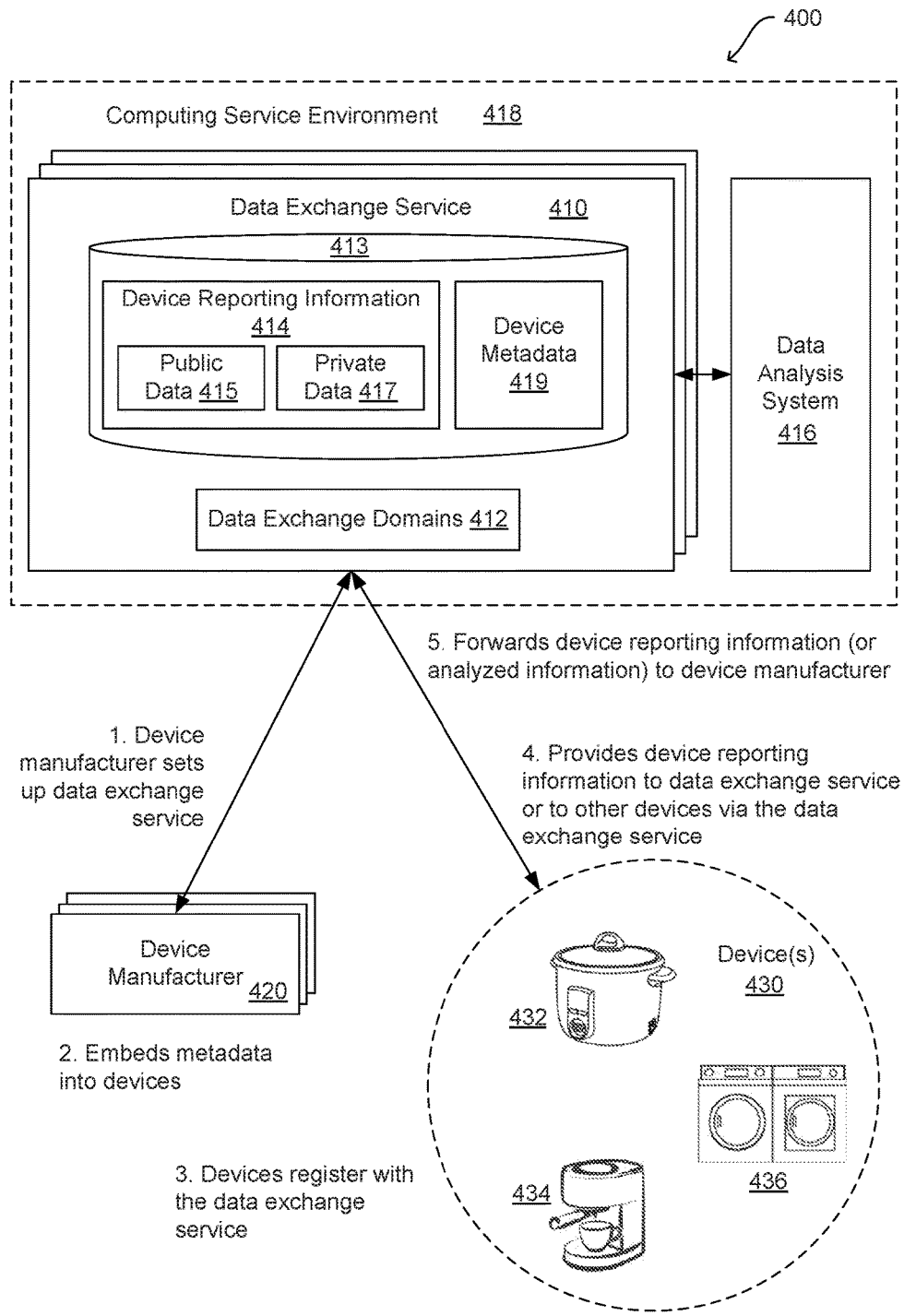
FIG. 4 illustrates a system and related operations for creating a data exchange service and registering a device with the data exchange service in order to enable the device to provide device reporting information according to an example of the present technology.

FIG. 4 illustrates a system 400 and related operations for creating a data exchange service 410 in a computing service environment 418. The data exchange service 410 may include an Internet of Things (IOT) data exchange service. The data exchange service 410 may be created for a customer, such as a device manufacturer 420. The data exchange service 410 may provide a platform in the computing service environment 418 that allows a plurality of device(s) 430 to provide device reporting information 414 (e.g., location information, health information) to the data exchange service 410. In one example, the devices 430 that provide the device reporting information 414 may be manufactured by the device manufacturer 420 that requests setup of the data exchange service 410. The device reporting information 414 may be accessible to the device manufacturer 420 via the data exchange service 410. The devices 430 may include Internet of Things (IOT) devices, such as electronic devices that are each assigned a unique identifier and capable of communicating data over a network. As a non-limiting example, the devices 430 may include a rice cooker 432, a coffee maker 434, and a washer and dryer 436.

In one configuration, the device manufacturer 420 may provide a set of instructions and definitions when setting up the data exchange service 410 in the computing service environment 418. For example, the device manufacturer 420 may define a format (or a canonical format) for the device reporting information 414 that is reported from the device 430. The defined format may apply to the devices 430 that are to be supported by the data exchange service 410, such that the devices 430 may communicate with the data exchange service 410 (or with other devices via the data exchange service 410) using the defined format. The device manufacturer 420 may define portions of the device reporting information 414 as being public information, private information or device metadata. Public information may include information that is collected by the device 430 and shareable with the data exchange service 410 or other devices. Examples of public information may include health information, location information or status information. Private information may include information that is collected by the device 430, but is not shareable with the data exchange service 410 or other devices. For example, the device 430 may be unable to share private information with other third parties, other subscribers, or other users. Examples of private information may include user information, usage information or device settings that are defined as private due to privacy concerns. The device metadata may be embedded into the devices 430. The device metadata may define the device's capabilities, policy information, the format of the device reporting information 414, and other information that describes the device 430.

In one example, the device manufacturer 420 may provide instructions defining workflows to be performed by the data exchange service 410 for the device 430. Alternatively, the workflows may be performed at the devices 430 themselves. The workflows may be triggered based on a type of device reporting information 414 that is reported to the data exchange service 410. As a non-limiting example, the device manufacturer 420 associated with the rice cooker 432 may set up a workflow that involves the rice cooker 432 sending an alert to the data exchange service 410 when the rice cooker 432 fails to operate correctly. In other words, the device reporting information 414 that is provided by the rice cooker 432 may be the alert. The workflow may involve the data exchange service 410 notifying the rice cooker's user (e.g., via the user's mobile phone) of the failed operation. As another non-limiting example, the device manufacturer 420 associated with the coffee maker 434 may setup a workflow that entails the coffee maker 434 directly contacting the user (e.g., via the user's mobile phone) when coffee has finished brewing. In this example, the workflow may not be performed by the data exchange service 410, but rather the coffee maker 434 may perform the workflow. In yet another example, the device manufacturer 420 may set up workflows for situations where the rice cooker 432, the coffee maker 434 and the washer and dryer 436 may share or exchange device reporting information 414 among themselves, and the exchanged device reporting information 414 may be in the canonical format defined by the device manufacturer 420. Other examples of devices 430 may include commercial printers, copiers or three dimensional (3D) printers. These devices 430 may communicate among each other, or with the data exchange service 410. In addition, workflows may be implemented at the devices 430 or at the data exchange service 410 based on device reporting information 414 that is collected or provided from these devices 430.

In one example, the device manufacturer 420 may provide instructions defining a set of publishers and/or listeners for the data exchange service 410. The publishers may include devices 430 that are capable of sending data to the data exchange service 430 or to other devices. The listeners may include devices, customers or third parties that are capable of receiving data from the data exchange service 430 or from other devices. In one example, a particular device 430 may be both a publisher and a listener. As a non-limiting example, the device manufacturer 420 may define the rice cooker 432 and the coffee maker 434 to be listeners, whereas the washer and dryer 436 may be defined as having both publishing and listening capabilities.

In one configuration, the instructions provided by the device manufacturer 420 may be in accordance with a predefined template. The template may be predefined based on a type of device and/or device manufacturer. For example, the device manufacturer 420 may set up the data exchange service 410 using instructions following a first predefined template when the devices 430 produced by the device manufacturer 420 are toys. In another example, the device manufacturer 420 may set up the data exchange service 410 using instructions following a second predefined template when the devices 430 produced by the device manufacturer 420 are automobile parts.

The data exchange service 410 may be created in the computing service environment 418 for the device manufacturer 420 based on the instructions and definitions received from the device manufacturer 420. A data exchange domain 412 may be created for the data exchange service 410. The data exchange domain 412 may be a domain name, such as "eLearning.dataexchange1.dataservice.com". In addition, the data exchange service 410 may generate a set of unique identifiers for the devices 430. The unique identifiers may include Internet Protocol version 6 (IPv6) addresses, uniform resource identifiers (URIs), or global unique identifiers. The data exchange service 410 may provide the data exchange domain 412 and the set of unique identifiers to the device manufacturer 420.

The device manufacturer 420 may include the data exchange domain 412, the unique identifier, the format for the device reporting information 414, data sharing rules (e.g., private data versus public data), workflow rules, device capabilities, policy information, etc. in device metadata that is embedded into each device 430. For example, the rice cooker 432 may be embedded with first device metadata, the coffee maker 434 may be embedded with second device metadata, and the washer and dryer 436 may be embedded with third device metadata. In other words, the device metadata may vary between the devices 430 because the unique identifiers, device capabilities, policies, etc. may vary between the devices 430. However, certain portions of the device metadata (e.g., the data exchange domain 412) may remain consistent between the devices 430. In one example, the device manufacturer 420 may embed the device metadata into the devices 430 during a manufacturing process.

A device 430 may perform a registration process with the data exchange service 410 using the device metadata (e.g., the data exchange domain 412, the unique identifier) embedded into the device 430. For example, the device 430 may access the data exchange domain 412 and provide the device's unique identifier in order to complete the registration process. The registration process may be initiated by the device's user. Following completion of the registration process, the device 430 may periodically provide device reporting information 414 to the data exchange service 410 in the computing service environment 418. The device 430 may communicate the device reporting information 414 to the data exchange service 414 using an appropriate network communication protocol, which includes but is not limited to, TCP/IP, WiFi, Long Term Evolution (LTE) telecommunications standards or Bluetooth.

In an alternative configuration, the device 430 may initially not include device metadata describing the data exchange service 410. For example, the data exchange domain 412 may not have been included in the device metadata when the device 430 was manufactured. The device manufacturer 420 may have initially produced the device 430 without this information, but at a later time, may wish to enable the device 430 to use the data exchange service 410. The device manufacturer 420 may set up the data exchange service 410, and receive the data exchange domain 412 for the data exchange service 410 and a set of unique identifiers. The device manufacturer 420 may communicate the data exchange domain 412 and an applicable unique identifier directly to the device 430. For example, the device manufacturer 420 may be configured to communicate with the device 430 in order to provide software updates/upgrades to the device 430 (or for other purposes). Upon receiving this information, the device 430 may register with the data exchange service 410, and thereafter, provide device reporting information 414 to the data exchange service 410.

In one example, the device reporting information 414 that is provided from the device 430 to the data exchange service 410 may include health information, a current location, a current status, usage levels, error codes, performance metrics, etc. The device 430 may provide the device reporting information 414 to the data exchange domain 412 associated with the data exchange service 410. The device reporting information 414 may be stored in a data store 413 at the data exchange service 410. The device reporting information 414 may include public data 415 and/or private data 417. The public data 415 may be shared with the device manufacturer 420 and other interested parties. The private data 117 may be shared with the device manufacturer 120 or other interested parties that have been granted appropriate permissions to access the public data 415. The data store 413 may also include device metadata 419 associated with the devices 430.

In one example, the data exchange service 410 may forward the device reporting information 414 to the device manufacturer 420 or other subscribers. The device manufacturer 420 may conveniently access the device reporting information 414 for a plurality of devices 430 via the data exchange service 410, without having to store and process the device reporting information 414. The device manufacturer 420 may gain knowledge on usage levels, performance, safety, reliability, etc. for the devices 430 based on the received device reporting information 414. The device manufacturer 420 may analyze the device reporting information 414 and make informed business decisions based on the device reporting information 414.

In one example, the device reporting information 414 may be provided to a data analysis system 416. The data analysis system 416 may analyze the device reporting information 414 according to a selected analysis tool. The analysis tool may be selected by the device manufacturer 420 and/or the data exchange service 410. In one example, the data analysis system 416 may identify trends in the device reporting information 414. The data analysis system 416 may cluster related portions of the device reporting information 414 together using pattern recognition, machine learning, or other data analysis techniques. As non-limiting examples, the data analysis system 416 may determine which product features are used less often, which product features are used more often, and which product features are most likely to malfunction based on the device reporting information 414. The analyzed device reporting information may be provided or be accessible to the device manufacturer 420, thereby enabling the device manufacturer 420 to make appropriate decisions (e.g., launch new products, market products to additional audiences, or remove unpopular product features).

In an alternative configuration, the devices 430 may exchange the device reporting information 414 with other devices. For example, the coffee maker 434 may send its device reporting information 414 to the rice cooker 432 via the data exchange service 410. For example, the coffee maker 434 may send device reporting information 414 to the data exchange service 410, and the data exchange service 410 may forward the device reporting information 414 to the rice cooker 432. In another example, the coffee maker 434 may send the device reporting information 414 directly to the rice cooker 432 using metadata about the rice cooker 432. The coffee maker's device metadata may include an IP address associated with the rice cooker 432 and the rice cooker's capabilities. The coffee maker 434 may use its device metadata about the rice cooker 432 when determining whether to send the device reporting information 414 to the rice cooker 432 (e.g., based on the rice cooker's capabilities), and if so, to which IP address the device reporting information 414 is to be sent.

The device 430 may periodically receive updated device metadata for itself, as well as device metadata describing other devices. In one scenario, the devices 430 may be automobile parts that are configured to communicate with each other and with the data exchange service 410. In one configuration, the devices 430 that are communicating data to each other may adhere to the same data format (or canonical format). Alternatively, the devices 430 may be capable of converting device reporting information 414 into a format that is supported at a receiving device. For example, the device 430 may translate data into the canonical format and then send the data to another device, or alternatively, the device 430 may convert received data into the canonical format in order to read the data. The canonical format may refer to a standard or uniform format that is supported by the devices. In yet another configuration, the devices 430 may be capable of analyzing the device reporting information 414 (e.g., using an analysis tool) and forwarding the analyzed information to the data exchange service 410 and/or directly to the device manufacturer 420.

In one example, the rice cooker 432 may communicate data (e.g., a cook time) to the washer and dryer 436 via the data exchange service 410. The data exchange service 410 may receive the data (e.g., the cook time) from the rice cooker 432, and convert the data to another form of data (e.g., a clothes drying duration) and then send the converted data to the washer and dryer 436. In another example, the rice cooker 432 may communicate data (e.g., a cook time) to the coffee maker 434 via the data exchange service 410, wherein the data exchange service 410 converts the data from the cook time to a run time before sending the converted data to the coffee maker 434. In these examples, the data exchange service 410 may convert between the run time, the cook time, and the clothes drying duration using a canonical data format. In yet another example, two types of data formats may be merged into a superset of both data formats using the canonical format as a central destination.

Figure 5:
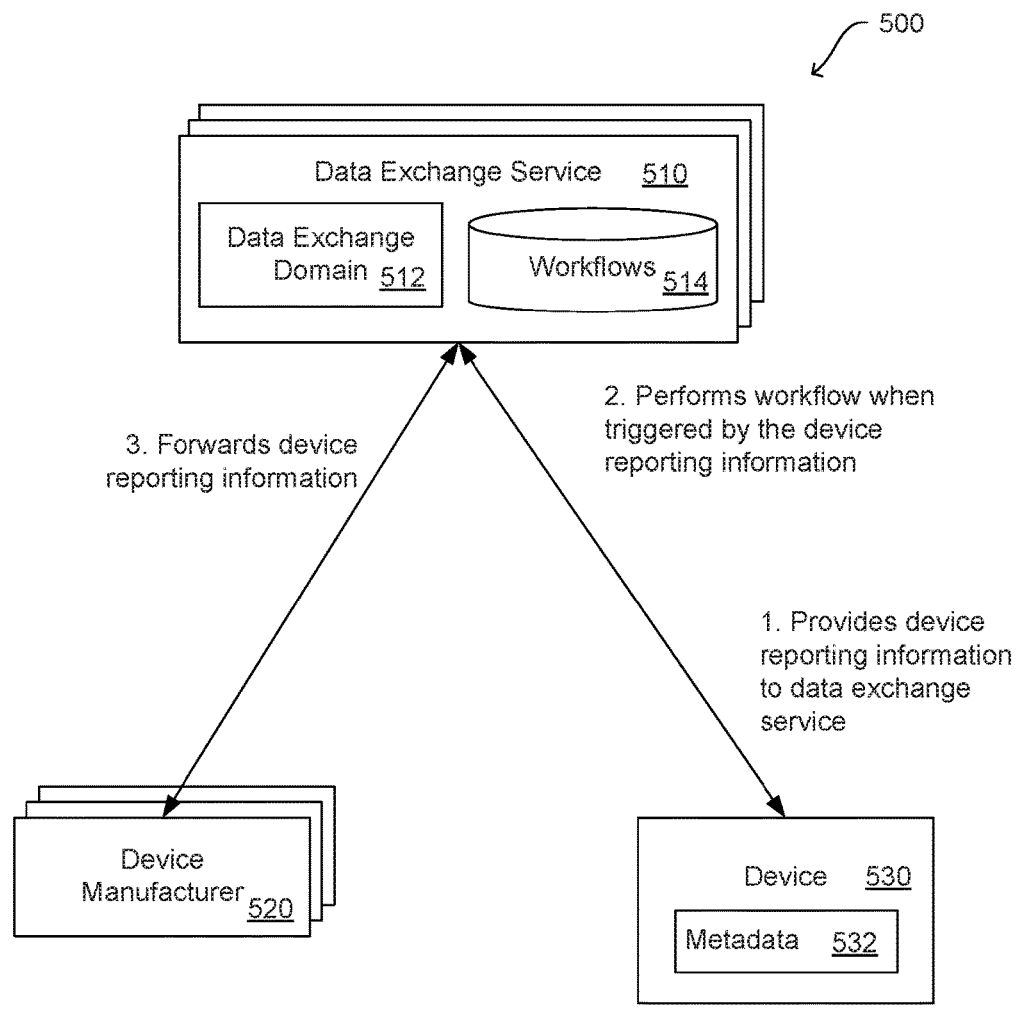
FIG. 5 illustrates a system and related operations for performing a workflow for a device in response to receiving device reporting information from the device according to an example of the present technology.

FIG. 5 illustrates a system 500 and related operations for performing a workflow 514 for a device 530 in response to receiving device reporting information from the device 530. The device 530 (e.g., an IOT device) may include device metadata 532 that describes the device's capabilities, policy information, a format of the device reporting information, and other information that describes the device 530. The device 530 may communicate the device reporting information to a data exchange domain 512 associated with a data exchange service 510. The data exchange service 510 can be an Internet of Things (IOT) data exchange service. The device reporting information may include health information for the device 530, a current location of the device 530, operations performed by the device 530, a current status of the device 530, etc. The data exchange service 510 may be triggered to perform the workflow 514 for the device 530 upon receiving the device reporting information. The workflow 514 may refer to actions or operations that are performed at the data exchange service 510 for the device 530. Alternatively, the workflow 514 may refer to actions or operations that are performed at the device 530. In addition, the data exchange service 510 may forward the device reporting information to a customer, such as a device manufacturer 520. The device reporting information may also be forwarded to a third party or an additional device that is a subscriber to the service provided by the data exchange service 510 for that data exchange domain 512.

As a non-limiting example, the device 530 may be a printer. The printer's device metadata 532 may indicate that the printer is capable of both receiving data from and sending data to the data exchange service 510. The printer's device metadata 532 may include the data exchange domain 512 for the data exchange service 510. The printer's device metadata 532 may indicate that the printer is to perform certain workflows 514 when paper is jammed in the printer. The printer may provide device reporting information, such as an indication that a toner level is low in the printer, to the data exchange service 510. This type of device reporting information may trigger a particular workflow 514 to be performed at the data exchange service 510. The workflow 514 may be defined by the device manufacturer 520. For example, the workflow 514 may involve the data exchange service 510 automatically placing an order for toner at an electronic retail store when the toner level is low. In another example, the printer may determine that paper is currently jammed, and perform a particular workflow 514 that involves texting the printer's owner. In this example, the workflow 514 performed by the printer does not involve the data exchange service 510.

Figure 6:
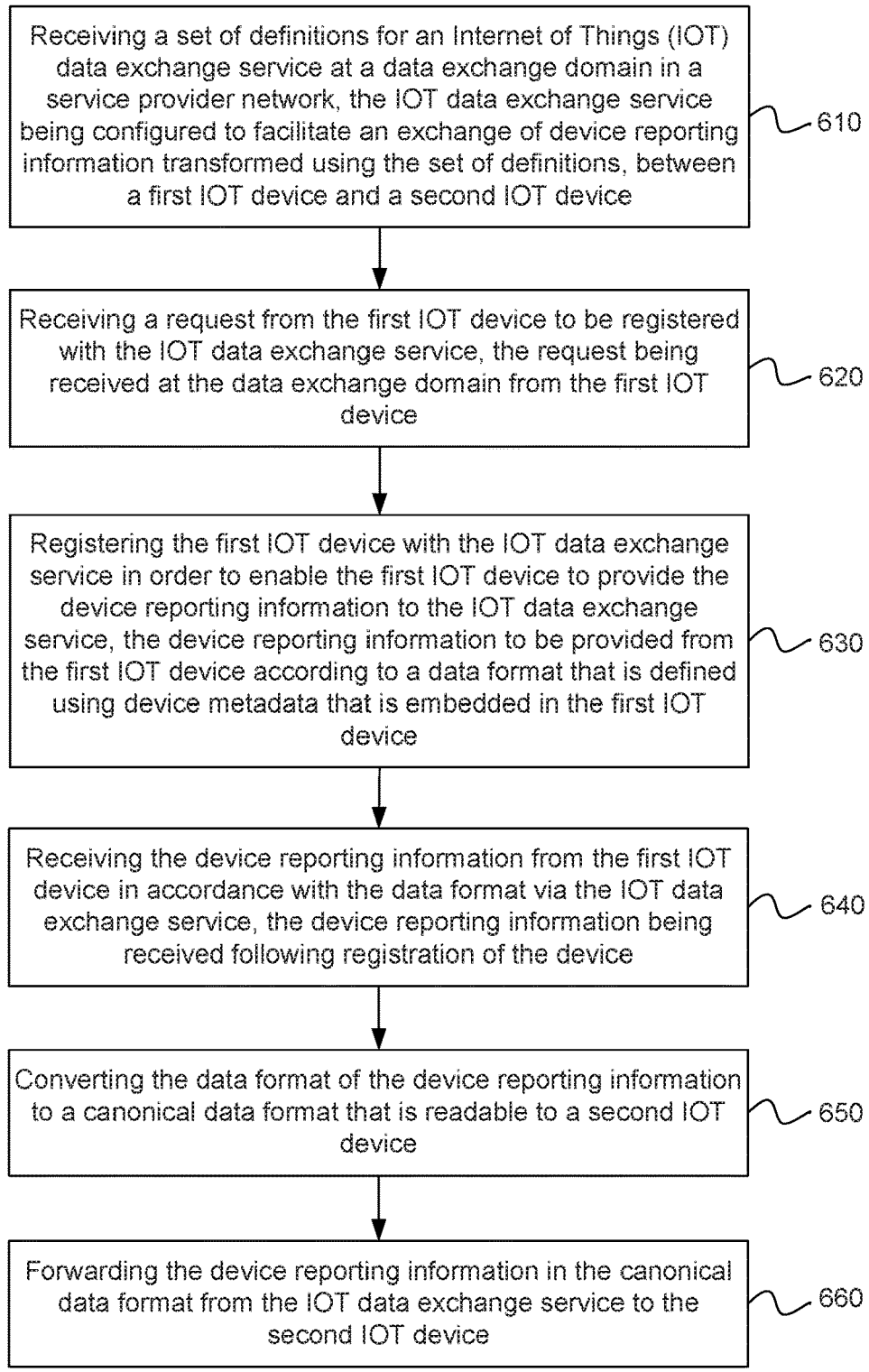
FIG. 6 is a flowchart of an example method for providing data exchange services.

FIG. 6 illustrates an example of a method for providing data exchange services. A set of definitions for an Internet of Things (IOT) data exchange service may be received, as in block 610. The IOT data exchange service may operate in a service provider network. The IOT data exchange service may be configured to facilitate an exchange of device reporting information transformed using the set of definitions, between a first IOT device and a second IOT device. The IOT data exchange service may be accessible via a data exchange domain (i.e., a domain name). The IOT data exchange service may enable a first IOT device to communicate device reporting information with a server associated with the IOT data exchange service. In addition, the IOT data exchange service may enable the first IOT device to exchange device reporting information with other IOT devices, such as the second IOT device.

A request may be received from the first IOT device to be registered with the IOT data exchange service, as in block 620. The request may be received from the first IOT device at the data exchange domain. In one example, the data exchange domain may be embedded into the first IOT device by a device manufacturer. When the first IOT device's user instructs the first IOT device to register with the IOT data exchange service, the first IOT device may access the data exchange domain in order to initiate a registration process with the IOT data exchange service. The first IOT device may provide its unique identifier during the registration process. In another example, the first IOT device may automatically access the IOT data exchange domain in order to initiate the registration process upon the first IOT device connecting to a network (e.g., the Internet).

The first IOT device may be registered with the IOT data exchange service in order to enable the first IOT device to provide device reporting information to the IOT data exchange service, as in block 630. The device reporting information may be provided according to a data format that is defined using device metadata that is embedded in the IOT device. In one example, the first IOT device may be registered with the IOT data exchange service in order to enable the first IOT device to share the device reporting information with a plurality of other IOT devices, such as the second IOT device. The device reporting information shared between the IOT devices may adhere to a defined data format. In another example, portions of the device reporting information may be defined as public information, private information or device metadata.

The device reporting information may be received from the first IOT device in accordance with the data format via the IOT data exchange service, as in block 640. The device reporting information may be received following registration of the first IOT device with the IOT data exchange service. The device reporting information may include health information for the first IOT device, a current location of the first IOT device and/or a current status of the first IOT device. The device reporting information received from the first IOT device may be stored in a data store associated with the IOT data exchange service.

The data format of the device reporting information may be converted to a canonical data format that is readable to a second IOT device, as in block 650. For example, the IOT data exchange service may convert the device reporting information into the canonical format using the set of definitions received for the IOT data exchange service. The canonical format may also be referred to as a uniform format that is supported by other IOT devices.

The device reporting information in the canonical data format may be forwarded from the IOT data exchange service to the second IOT device, as in block 660. Thus, the IOT data exchange service can act as a broker for exchanging IOT data (or device reporting information) between the first IOT device and the second IOT device. In other words, the first IOT device and the second IOT device can communicate device reporting information to each other via the IOT data exchange service. In addition, the IOT data exchange service can ensure that the IOT devices receive the IOT data in a format compatible with a receiving IOT device.

In one example, the device reporting information received from the first IOT device may be analyzed according to a selected analysis tool. The analysis of the device reporting information may be provided to a device manufacturer. In another example, device reporting information received from a plurality of IOT devices that are registered with the IOT data exchange service may be aggregated. The aggregated device reporting information for the plurality of IOT devices may be provided to a device manufacturer.

Figure 7:
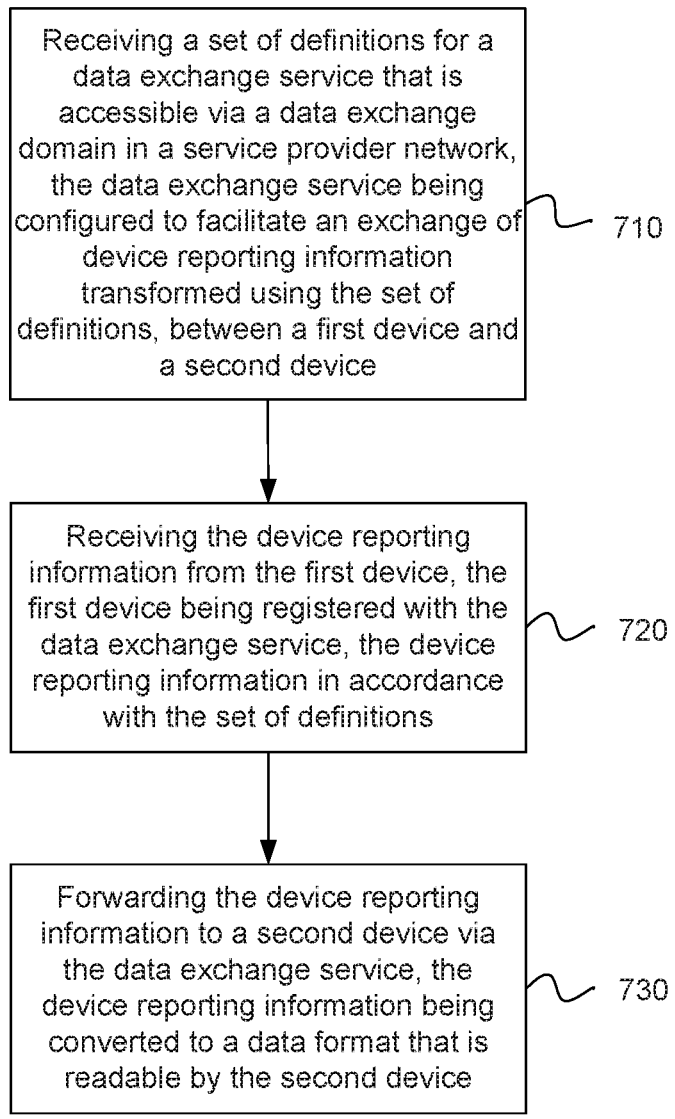
FIG. 7 is a flowchart of another example method for providing data exchange services.

FIG. 7 illustrates an example of a method for providing data exchange services. A set of definitions for a data exchange service that is accessible via a data exchange domain may be received, as in block 710. The data exchange service may operate in a service provider network. The data exchange service may be configured to facilitate an exchange of device reporting information transformed using the set of definitions. The exchange of device reporting information may occur between a first device and a second device. In one example, the first device and/or the second device can be Internet of Things (IOT) devices. In another example, either the first device or the second device can be a manufacturer device. The manufacturer device can include a computing device, such as a server, that is associated with a manufacturer that sets up the data exchange service. The data exchange domain may be a domain name associated with the data exchange service. The data exchange service may enable the first device to provide device reporting information to a server associated with the data exchange service, and the device reporting information may be accessible to a device manufacturer via the data exchange service. In one example, the data exchange service may be an Internet of Things (IOT) data exchange service. In addition, the first device and the second device may be IOT devices.

In one example, instructions may be received from the device manufacturer for setting up the data exchange service. The instructions received from the device manufacturer may define portions of the device reporting information as being public information, private information or device metadata. In another example, the instructions received from the device manufacturer may include workflow rules to be performed for the first device based on a type of device reporting information that is received from the first device. In yet another example, instructions may be received for setting up the data exchange service according to a predefined template that corresponds with a type of device that is to be registered with the data exchange service.

The device reporting information may be received from the first device, as in block 720. The device reporting information may be in accordance with the set of definitions. The device reporting information may include health information for the device, a current location of the device and/or a current status of the device. The device reporting information may be stored on a server associated with the data exchange service.

In one example, the device reporting information may be received from the first device after the first device registers with the data exchange service. The first device may send a registration request to the data exchange service in order to be registered. The registration request may include an identifier associated with the first device. In other words, the identifier may enable the first device to register with the data exchange service. The identifier may include an internet protocol (IP) address, a uniform resource indicator, or a global unique identifier.

The device reporting information may be forwarded to a second device via the data exchange service, as in block 730. The device reporting information may be converted to a data format that is readable by the second device. Thus, the data exchange service can act as a broker for exchanging device reporting information between the first device and the second device. In other words, the first device and the second device can communicate to each other via the data exchange service.

In one configuration, instructions may be received for setting up the data exchange service from a device manufacturer. The instructions may specify a data format for exchanging the device reporting information. The data exchange domain may be provided to the device manufacturer, and the device manufacturer may embed the data exchange domain and the data format as device metadata in the first device. The first device may provide the device reporting information according to the data format following registration of the first device.

In one example, the device reporting information that is communicated from the first device via the data exchange service may be collected. The device reporting information may be provided to a device manufacturer from the data exchange service. In another example, the device reporting information that is communicated from the first device via the data exchange service may be analyzed according to a selected analysis tool. An analysis of the device reporting information may be provided to the device manufacturer from the data exchange service.

In one configuration, instructions may be received from the device manufacturer for setting up the data exchange service according to an updated scheme for the first device that provides the device reporting information. The data exchange service may provide the updated scheme to the first device. Thereafter, device reporting information may be received from the first device via the data exchange service according to the updated scheme. In another configuration, the data exchange service may perform a workflow in response to receiving a type of device reporting information that triggers a performance of the workflow. In yet another configuration, the device manufacturer may be charged based on an amount of data reported from the first device using the data exchange service.

Figure 8:
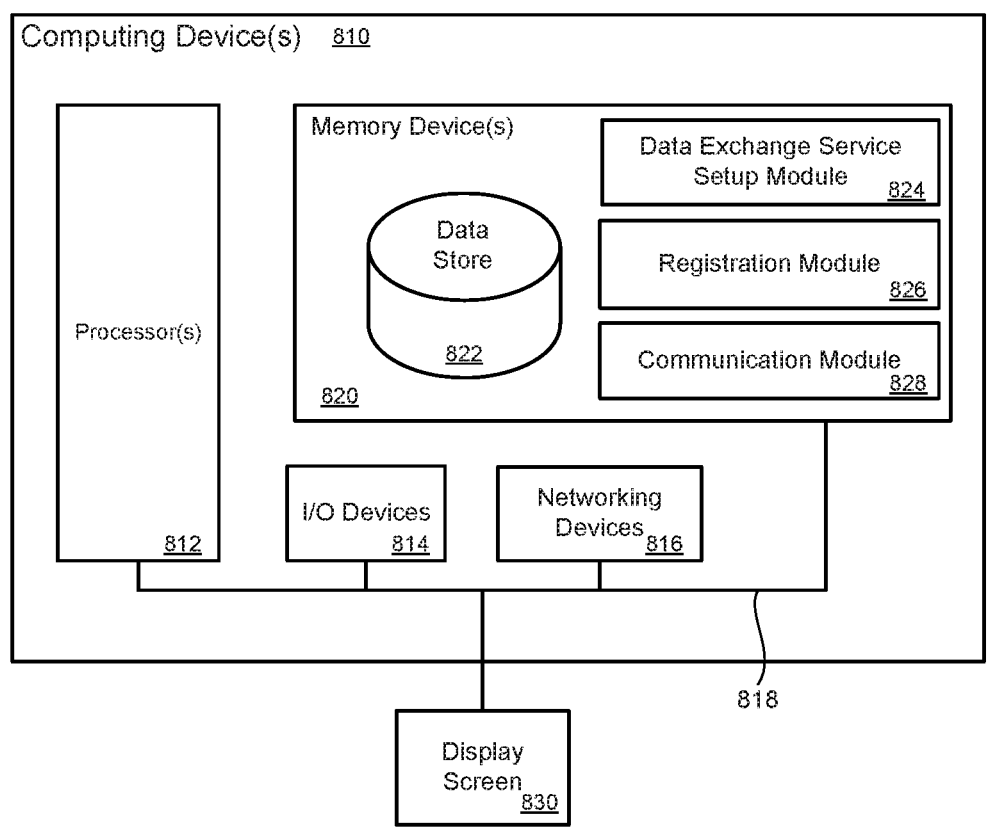
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules that are executable by the processor(s) 812 and data for the modules. Located in the memory device 820 are modules executable by the processor. For example, a data exchange service setup module 824, a registration module 826, a communication module 828, and other modules may be located in the memory device 820. The modules may execute the functions described earlier. A data store 822 may also be located in the memory device 820 for storing data related to the modules and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen 830 that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for providing data exchange services, the method comprising:
   under control of one or more computer systems configured with executable instructions:
   receiving a set of definitions for an Internet of Things (IOT) data exchange service at a data exchange domain in a service provider network, the IOT data exchange service being configured to facilitate an exchange of device reporting information transformed using the set of definitions, between a first IOT device and a second IOT device, using one or more processors of the computer systems;
   receiving a request from the first IOT device to be registered with the IOT data exchange service, the request being received at the data exchange domain from the first IOT device, using the one or more processors of the computer systems;
   registering the first IOT device with the IOT data exchange service in order to enable the first IOT device to provide the device reporting information to the IOT data exchange service, the device reporting information to be provided from the first IOT device according to a data format that is defined using device metadata that is embedded in the first IOT device, using the one or more processors of the computer systems;
   receiving the device reporting information from the first IOT device in accordance with the data format via the IOT data exchange service, the device reporting information being received following registration of the device, using the one or more processors of the computer systems;
   converting the data format of the device reporting information to a canonical data format using the set of definitions, wherein the canonical data format is readable by the second IOT device, using one or more processors of the computer systems; and
   forwarding the device reporting information in the canonical data format from the IOT data exchange service to the second IOT device, using one or more processors of the computer systems.

2. The method of claim 1, further comprising defining portions of the device reporting information as at least one of: public information, private information or device metadata.

3. The method of claim 1, further comprising registering the first IOT device with the IOT data exchange service in order to enable the first IOT device to share the device reporting information with a plurality of other IOT devices via the IOT data exchange service.

4. The method of claim 1, further comprising:
   aggregating device reporting information received from a plurality of IOT devices that are registered with the IOT data exchange service; and
   providing device reporting information for the plurality of IOT devices to a device manufacturer.

5. The method of claim 1, further comprising:
   analyzing the device reporting information received from the first IOT device according to a selected analysis tool; and
   providing an analysis of the device reporting information to a device manufacturer.

6. A computer-implemented method, the method comprising:
   under control of one or more computer systems configured with executable instructions:
   receiving a set of definitions for a data exchange service that is accessible via a data exchange domain in a service provider network, the data exchange service being configured to facilitate an exchange of device reporting information transformed using the set of definitions, between a first device and a second device, using one or more processors of the computer systems;
   receiving the device reporting information from the first device, the first device being registered with the data exchange service, the device reporting information in accordance with the set of definitions, using the one or more processors of the computer systems; and
   forwarding the device reporting information to a second device via the data exchange service, the device reporting information being converted to a canonical data format using the set of definitions, wherein the canonical data is readable by the second device, using one or more processors of the computer systems.

7. The method of claim 6, further comprising receiving instructions for setting up the data exchange service from a device manufacturer, the instructions defining portions of the device reporting information as at least one of: public information, private information or device metadata.

8. The method of claim 6, further comprising receiving instructions for setting up the data exchange service from a device manufacturer, the instructions including workflow rules to be performed for the first device based on a type of device reporting information reported from the first device.

9. The method of claim 6, further comprising:
   receiving instructions for setting up the data exchange service from a device manufacturer, the instructions specifying a data format for the first device to use for providing the device reporting information; and
   providing the data exchange domain to the device manufacturer, the device manufacturer embedding the data exchange domain and the data format as device metadata in the first device.

10. The method of claim 6, further comprising creating an identifier for the first device that enables the first device to register with the data exchange service, the identifier including at least one of: an internet protocol (IP) address, a uniform resource indicator, or a global unique identifier.

11. The method of claim 6, further comprising:
    collecting the device reporting information received from the first device via the data exchange service; and
    providing the device reporting information to the second device, the second device being associated with a device manufacturer from the data exchange service.

12. The method of claim 6, further comprising:
    collecting the device reporting information received from the first device via the data exchange service;
    analyzing the device reporting information according to a selected analysis tool; and
    providing an analysis of the device reporting information to a device manufacturer from the data exchange service.

13. The method of claim 6, further comprising registering the first device with the data exchange domain in response to receiving a registration request from the first device, the registration request including an identifier associated with the first device.

14. The method of claim 6, further comprising performing a workflow for the first device in response to receiving a type of device reporting information from the first device that triggers a performance of the workflow.

15. The method of claim 6, further comprising receiving instructions for setting up the data exchange service according to a predefined template that corresponds with a type of device that is to be registered with the data exchange service.

16. The method of claim 6, further comprising:
   receiving instructions from a device manufacturer for setting up the data exchange service according to an updated scheme for the first device that provides the device reporting information;
   providing the updated scheme to the first device from the data exchange service; and
   receiving the device reporting information from the first device via the data exchange service according to the updated scheme.

17. The method of claim 6, further comprising charging a device manufacturer based on an amount of data reported from the first device using the data exchange service.

18. The method of claim 6, wherein the device reporting information received from the device is selected from a group consisting of at least one of: health information for the first device, a current location of the first device, operations performed by the first device, or a current status of the first device.

19. A system for providing data exchange services, the system comprising:
   a processor;
   a memory device including a data store to store a plurality of data and instructions that, when executed by the processor, cause the processor to execute:
   a data exchange service setup module configured to receive a set of definitions for an Internet of Things (IOT) data exchange service that is accessible via a data exchange domain, the IOT data exchange service configured to facilitate an exchange of device reporting information transformed using the set of definitions, between a first IOT device and a second IOT device;
   a registration module configured to:
      receive a request from the first IOT device to be registered with the IOT data exchange service, the request being received from the first IOT device at the data exchange domain; and
      register the first IOT device with the IOT data exchange service in order to enable the first IOT device to communicate device reporting information to the IOT data exchange service, the device reporting information to be communicated according to a defined data format included in device metadata that is embedded in the first IOT device; and
   a communication module configured to:
      receive the device reporting information from the first IOT device in accordance with the data format via the IOT data exchange service, the device reporting information being received following registration of the first IOT device; and
      forward the device reporting information from the IOT data exchange service to a second IOT device for consumption at the second IOT device, the device reporting information being converted to a canonical data format from the defined data format using the set of definitions, and the device reporting information in the canonical data format is readable by the second IOT device.

20. The system of claim 19, further comprising a data analysis module configured to analyze the device reporting information received from the first device according to a selected analysis tool.

\* \* \* \* \*